United States Patent
Collin et al.

(10) Patent No.: US 10,279,999 B2
(45) Date of Patent: May 7, 2019

(54) AUTOMATED STORAGE/RETRIEVAL SYSTEM COMPRISING AN ELEVATOR COOPERATING WITH A TRANSFER DEVICE AND A SEQUENCER

(71) Applicant: Savoye, Dijon (FR)

(72) Inventors: Jean-Michel Collin, Merceuil (FR); Stephane Pietrowicz, Fixin (FR)

(73) Assignee: SAVOYE, Dijon (FR)

(*) Notice: Subject to any disclaimer, the term of this patent is extended or adjusted under 35 U.S.C. 154(b) by 243 days.

(21) Appl. No.: 14/812,749

(22) Filed: Jul. 29, 2015

(65) Prior Publication Data
US 2016/0031643 A1    Feb. 4, 2016

(30) Foreign Application Priority Data

Jul. 29, 2014    (FR) ...................................... 14 57341

(51) Int. Cl.
*B65G 1/04*    (2006.01)
*B65G 1/06*    (2006.01)

(52) U.S. Cl.
CPC ............ *B65G 1/06* (2013.01); *B65G 1/0485* (2013.01)

(58) Field of Classification Search
CPC .................................................... B65G 1/0421
USPC ................................ 414/273, 270, 277, 807
See application file for complete search history.

(56) References Cited

U.S. PATENT DOCUMENTS

| | | | |
|---|---|---|---|
| 4,768,914 A * | 9/1988 | Sing ..................... | B65G 1/0478 198/300 |
| 2006/0245858 A1 | 11/2006 | Suess | |
| 2008/0000754 A1 | 1/2008 | Aust et al. | |
| 2010/0036521 A1 | 2/2010 | Schafer | |

(Continued)

FOREIGN PATENT DOCUMENTS

| | | |
|---|---|---|
| CA | 2735988 A1 | 3/2010 |
| DE | 202004008678 U1 | 8/2004 |
| DE | 202006003068 U1 | 7/2007 |

(Continued)

OTHER PUBLICATIONS

European Search Report dated Nov. 27, 2015 for corresponding EP Application No. 15177644.

(Continued)

*Primary Examiner* — Saul Rodriguez
*Assistant Examiner* — Willie Berry, Jr.
(74) *Attorney, Agent, or Firm* — David D. Brush; Westman, Champlin & Koehler, P.A.

(57) ABSTRACT

An automated storage/retrieval system is proposed. The system includes a control system, at least one storage unit having several levels at which loads can be picked or deposited and at least one interface conveyor for entries/exits of loads into and out of the system, and at least one elevator for a transfer of loads between the at least interface conveyor and the at least one storage unit. The at least one elevator is a multi-level elevator, and the automated storage/retrieval system furthermore includes at least one multi-level transfer device capable of simultaneously receiving, on several levels, a set of loads intended for or coming from at least one elevator; and at least one sequencer provided with elements of vertical moving and capable of transferring loads between the at least one multi-level transfer device and the at least one interface conveyor.

14 Claims, 10 Drawing Sheets

(56) References Cited

U.S. PATENT DOCUMENTS

2014/0003893 A1* 1/2014 Takahara .............. B65G 1/06
                                                     414/273
2015/0158677 A1   6/2015 Philipp et al.

FOREIGN PATENT DOCUMENTS

| EP | 1681247 A1 | 7/2006 |
| JP | 60262703 A | 12/1985 |
| JP | 62249818 A | 10/1987 |
| WO | 2008119497 A1 | 10/2008 |
| WO | 2014023730 A1 | 2/2014 |

OTHER PUBLICATIONS

English translation of French Written Opinion dated Mar. 24, 2015 for corresponding French Patent Application No. 1457341, filed Jul. 29, 2014.
French Search Report and Written Opinion dated Mar. 24, 2015 for corresponding French Patent Application No. 1457341, filed Jul. 29, 2014.

* cited by examiner

AUTOMATED STORAGE/RETRIEVAL SYSTEM COMPRISING AN ELEVATOR COOPERATING WITH A TRANSFER DEVICE AND A SEQUENCER

1. FIELD OF THE DISCLOSURE

The field of the disclosure is that of logistics.

More specifically, the present disclosure relates to an automated storage/retrieval system comprising especially the following elements: a control system, at least one storage unit comprising several levels at which loads can be picked or deposited, at least one interface conveyor for the entries and exits of loads into/out of the system and at least one elevator for a transfer of loads between the at least one interface conveyor and the at least one storage unit.

The disclosure can be applied especially but not exclusively when each multi-level storage unit is as described here below with reference to FIGS. 1A, 1B and 1C. More generally, the present disclosure can be applied in any context where the loads (of the tub, cardboard box, table type or the like) are picked or made available on a set of levels.

2. TECHNOLOGICAL BACKGROUND

Figure 1A:
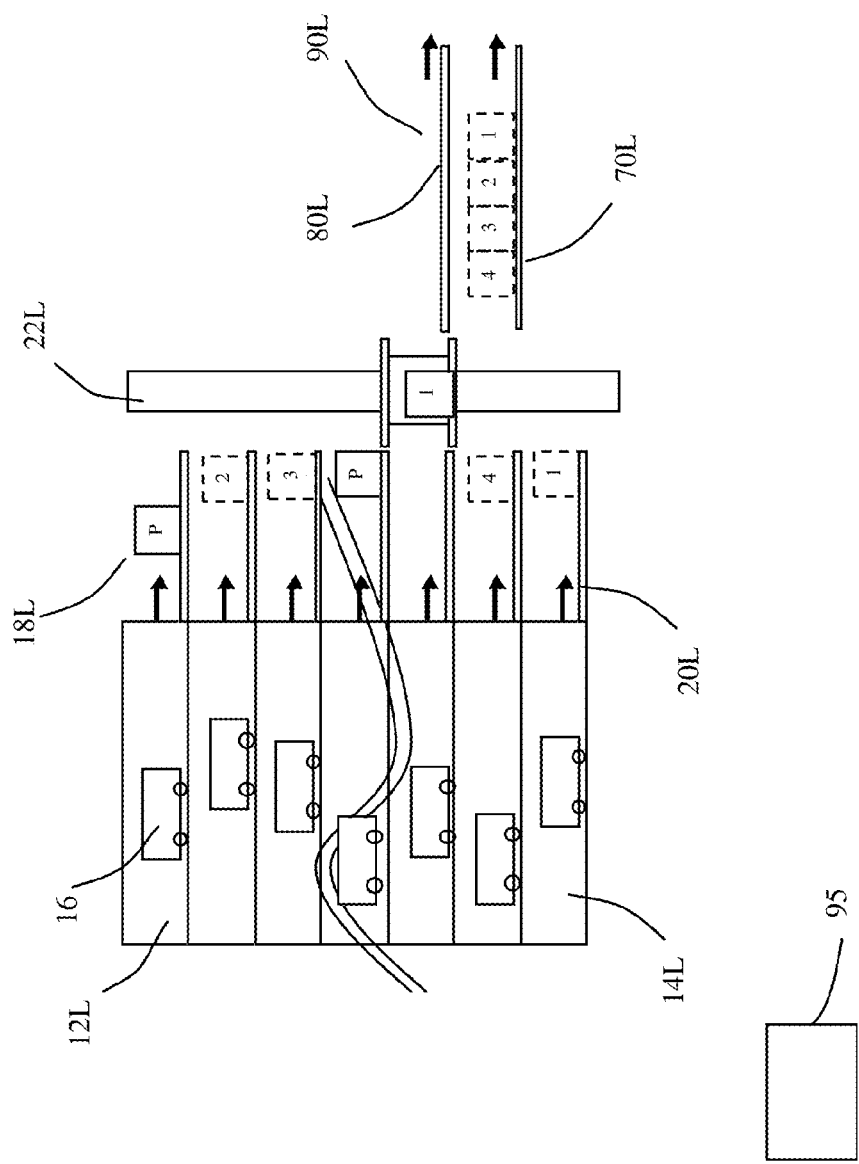
Figure 1B:
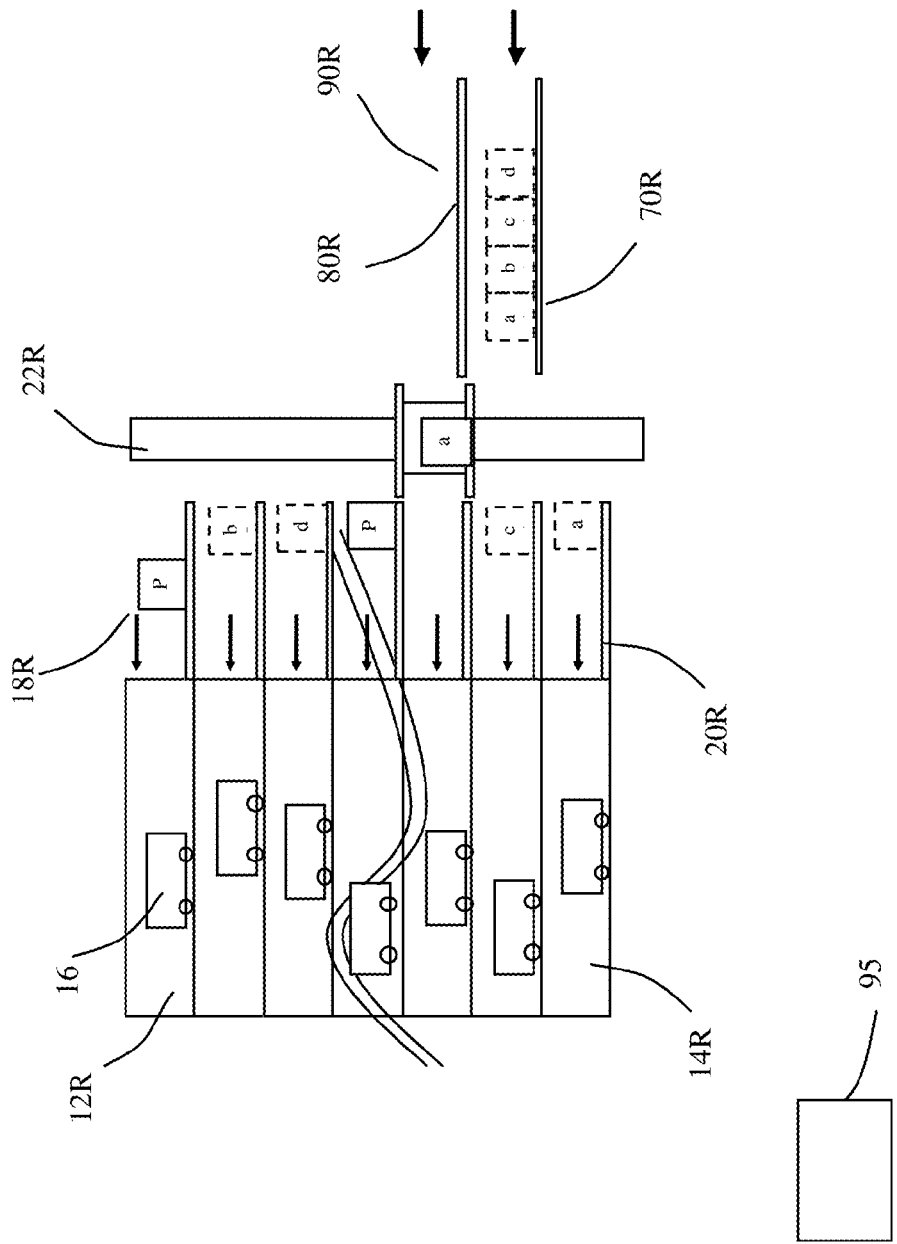
Figure 1C:
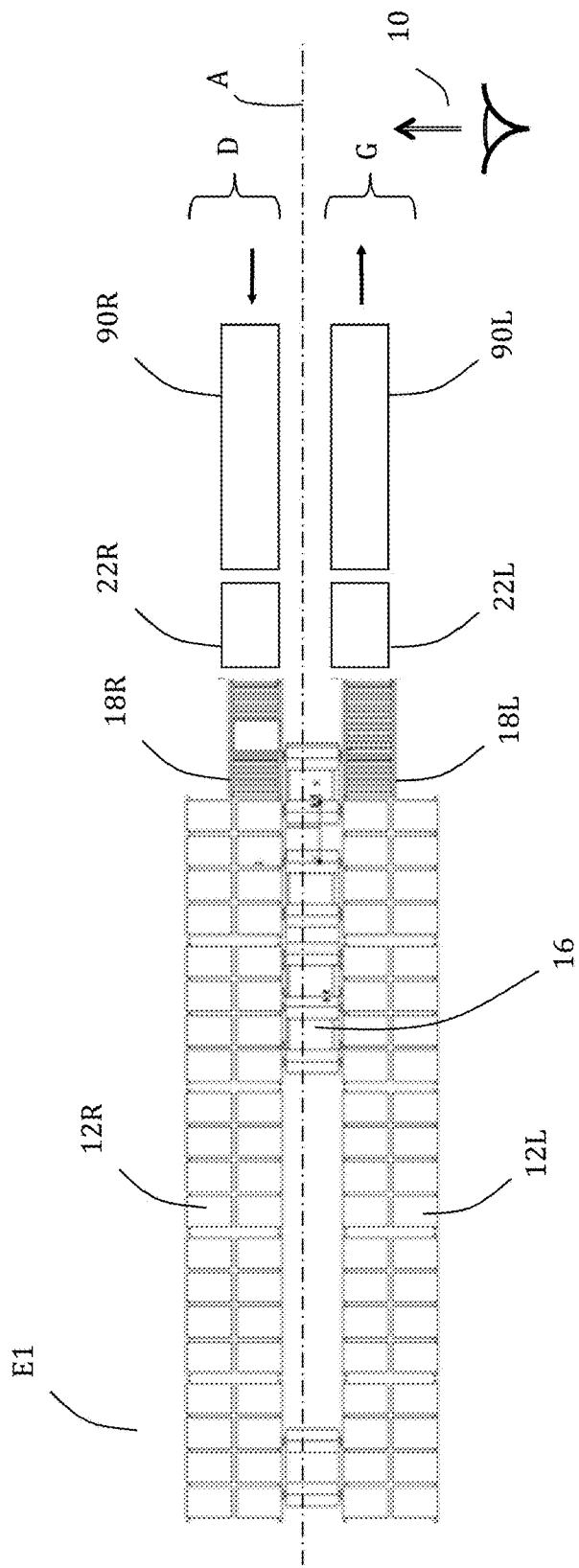

FIGS. 1A, 1B and 1C (left-hand side view, right-hand side view and top view respectively) illustrate an example of an automated storage/retrieval system according to the prior art.

In this example, the system comprises a storage unit E1 comprising two racks 12L and 12R, with superimposed levels (14L and 14R) and sub-divided into locations (double depth in this example) each intended to receive two loads P.

The storage unit E1 also comprises an exit buffer station 18L and an entry buffer station 18R. The exit buffer station 18L is positioned at one end of the rack 12L and is adjacent to it. It is constituted by a set of exit buffer conveyors 20L. The number of exit buffer containers 20L is the same as that of the levels 14L in the rack 12L. The entry buffer station 18R is positioned at one end of the rack 12R, and is adjacent to it. It is constituted by a step of entry buffer conveyors 20R. The number of entry buffer conveyors 20R is the same as that of the levels 14R in the rack 12R. The buffer conveyors 20R and 20L are for example of a motor-driven type with a dual sense of rotation.

A lane serves the two racks 12R and 12L and comprises at each level a channel for moving. Shuttles 16 (for example one per level, of a motor-driven and single-load or multi-load type) make it possible, by moving on the channels to transfer loads between the locations (within the racks 12R and 12L) and the buffer conveyors 20R, 20L. Each shuttle 16 of a given level has access to locations (within the racks 12R and 12L) and the buffer conveyors 20R and 20L of this given level.

In order to facilitate the description, we consider the axis (referenced A in FIG. 1C) of the lane between the two racks 12R and 12L and the term "right-hand part of the system" (referenced D in FIG. 1C) and "left-hand part of the system (referenced G in FIG. 1C) designate the two parts of the system located on either side of this axis A. It will be noted that the "side view of the right-hand part" presented in FIG. 1B and the "side view of the left-hand part" presented in FIG. 1A are both views along a same direction (referenced 10 in FIG. 1C). This observation is valid for all the side views of the right-hand and left-hand parts presented here below.

The system also comprises two elevators 22R and 22L. Each elevator is positioned at the end of the buffer conveyors 20R and 20L situated at the end of one of the racks 12R and 12L. Each elevator has a single level used to transport a load delivered by one of the buffer conveyors 20L and 20R. In a first known variant (not shown), each elevator has a single level used to transfer two loads. In a second known variant (not shown), each elevator has two superimposed levels each used to transport two loads (giving a total capacity of four loads).

Each elevator 22R and 22L marks a controlled stop facing each buffer conveyor 20R and 20L. These stops are used to obtain entries/exits of loads onto the racks 12R and 12L.

Each elevator is positioned between firstly the buffer conveyors 20R and 20L situated at the end of one of the racks 12R and 12L and secondly interface conveyors for the entries/exits of loads into/out of the system. In the example illustrated, the elevator 22R of the right-hand part of the system is associated with two entry interface conveyors 70R and 80R forming an entry interface station 90R (see FIG. 1B), and the elevator 22L of the left-hand part of the system is associated with two exit interface conveyors 70L and 80L forming an exit interface station 90L (see FIG. 1A). In other words, each elevator 22R and 22L enables a transfer of loads between: on the one hand the buffer conveyors 20R and 20L at the end of the one of the racks 12R and 12L, and on the other hand the entry interface conveyors 70R and 80R and the exit interface conveyors 70L and 80L.

The entry interface conveyors 70R and 80R, the elevator 22R and the buffer conveyors 20R (i.e. the right-hand part elements) as well as the shuttles 16 (common to the right-hand and left-hand parts) enter the loads onto the two racks 12R and 12L. The exit interface conveyors 70L and 80L, the elevator 22L and the buffer conveyors 20L (i.e. the elements of the left-hand part) as well as the shuttles 6 (common to the right-hand and left-hand parts) obtain the exit of the loads out of the two racks 12R and 12L. The shuttles have access to the locations of the rack 12R of the right-hand part as well as to the locations of the rack 12L of the left-hand part.

A control system (symbolized by the rectangle referenced 95) controls at least certain of the elements of the storage unit E1 (for example the buffer conveyors and the shuttles) the elevators 22R and 22L and the entry interface conveyors 70R and 80R and exit interface conveyors 70L and 80L.

One drawback of such a system of storage and retrieval according to the prior art is that the cycle time of each elevator proves to be relatively great compared with the number of actions of entry or exit performed. Indeed, at each action of entry or exit of a load, a half cycle is "lost" in the movement of the elevator in an empty state and does not consist of a value-adding action Neither the above-mentioned first known variant (each elevator has a single level to convey two loads) nor the second known variant (each elevator has two superimposed levels each enabling the transportation of two loads) enables this drawback to be overcome.

More generally, one of the problems encountered in the designing of automated storage/retrieval systems is that of optimizing the implementation of each of the elements constituting the system and especially of the elevators and of optimizing the general pace of the system making it possible for example to achieve an objective in terms of preparing orders (i.e. a number of loads made available to prepare a set of orders in a given time).

Another set of problems is related to the capacity to be able to deliver the loads in a desired order when they exit from the system. This set of problems is known as the "sequencing constraint".

3. SUMMARY

One particular embodiment of the present disclosure proposes an automated storage/retrieval system comprising a control system, at least one storage unit comprising several levels at which loads can be picked or deposited and at least one exit interface conveyor for exits of loads out of the system. The system furthermore comprises an exit elevator comprising K levels with K≥2, an exit transfer device comprising K levels, and an exit sequencer provided with means of vertical moving. The control system is adapted to controlling:
- at each iteration of a rising/descending cycle of the exit elevator, a transfer of a group of N loads from the at least one multi-level storage unit to the exit elevator, with N being smaller than or equal to a capacity of the exit elevator in number of loads;
- a transfer, simultaneously on the K levels, of each group of N loads from the exit elevator to the exit transfer device; and
- a transfer of each group of N loads, via the exit sequencer, from the exit transfer device to the at least one exit interface conveyor, under a constraint of order of departure of the N loads on said at least one exit interface conveyor.

One particular embodiment of the disclosure proposes an automated storage/retrieval system comprising a control system, at least one storage unit comprising several levels at which loads can be picked or placed and at least one entry interface conveyor for entries of loads into the system. The system furthermore comprises an entry elevator comprising K levels with K≥2, an entry transfer device comprising K levels, and an entry sequencer provided with means of vertical moving. The control system is adapted to controlling:
- a transfer of loads via the entry sequencer, from said at least one entry interface conveyor to the entry transfer device in forming, in the entry transfer device, groups of N loads distributed on the K levels with N being smaller than or equal to a capacity of the entry elevator in number of loads;
- a transfer, simultaneously on the K levels, of each group of N loads from the entry transfer device to the entry elevator; and
- at each iteration of a rising/descending cycle of the entry elevator, a transfer of each group of N loads, from the entry elevator to the at least one multi-level storage unit under a constraint of depositing of the N loads.

One particular embodiment of the disclosure proposes an automated storage/retrieval system comprising: a control system, at least one storage unit comprising several levels on which the loads can be picked or deposited, at least one interface conveyor for the entries and/or exits of loads into/out of the system and at least one elevator for a transfer of loads between said at least one interface conveyor and the at least one storage unit. The at least one elevator is a multi-level elevator and the automated storage/retrieval system furthermore comprises:
- at least one multi-level transfer device capable of simultaneously receiving, on several levels, a set of loads intended for and coming from the at least one elevator; and
- at least one sequencer provided with means of vertical moving and capable of transferring loads between the at least one multi-level transfer device and the at least one interface conveyor.

The general principle of an exemplary embodiment of the disclosure therefore consists in replacing the single-level elevator of the prior art with a combination of three elements:
- a multi-level elevator which significantly increases the general rate of the automated storage/retrieval system since at each iteration of a rising/descending cycle of the multi-level elevator, this elevator can transport a group of N loads (with N≤Nmax and Nmax being a capacity of the elevator in number of loads);
- a multi-level transfer device which fulfils a buffer function enabling a group of N loads to be put on hold, after they have been unloaded by the elevator (in the case of an exit of loads) or before they are loaded onto the elevator (in the case of entry of loads) (the capacity of the multi-level transfer device is for example equal to or greater than that of the multi-level elevator); and
- a sequencer which fulfils a sequencing function enabling the transfer, in a determined order (i.e. a desired sequence) of the loads from the multi-level transfer device to the at least one exit interface conveyor (the case of an exit of loads) or from the at least one entry interface conveyor to the multi-level transfer device (in the case of an entry of loads).

This combination of three elements therefore makes it possible to achieve the desired goal, namely in significantly increasing the general rate of the automated storage/retrieval system while at the same time complying with sequencing constraints.

According to one particular characteristic, the at least one multi-level elevator and the at least one multi-level transfer device are multi-load devices at each level.

In this way, the general rate of the automated storage/retrieval system is further increased.

According to one particular characteristic, the at least one multi-level elevator and the at least one multi-level transfer device comprise two levels and a capacity of two loads at each level.

Thus, each elevator and each transfer device handles groups of four loads (N=4) which is an efficient compromise between the rate obtained and the complexity of these apparatuses.

In one alternative embodiment, the at least one multi-level transfer device is provided with vertical moving means and replaces the at least one sequencer.

Thus, in this variant, the multi-level transfer device acts as a sequencer. This alternative is therefore more compact and reduces the hardware necessary.

According to one particular characteristic, the at least one sequencer comprises only one level.

Thus, the sequencer is simple to make, handle and control.

According to one particular characteristic, the at least one multi-level storage unit comprises at least one multi-level rack, at least each level of which is sub-divided into receiving locations for receiving at least one load; at least one multi-level buffer station, each level of which comprises a buffer conveyor positioned at one end of a level of the at least one rack; and means for transferring loads between the locations and the buffer conveyors and the at least one elevator enables the transfer of loads between said at least one interface conveyor and the at least one buffer station.

In other words, the proposed technique can be implemented in a context where each multi-level storage unit is of a classic type as described here above with reference to FIGS. 1A, 1B and 1C.

According to one particular characteristic, the automated storage/retrieval system comprises first and second multi-level storage units each comprising at least one multi-level stage, at least one buffer station and transfer means and the at least one elevator is positioned between the buffer stations of the first and second multi-level storage units for a transfer of loads between said at least one interface conveyor and the buffer stations of the first and second multi-level storage units.

Thus, the proposed technique can be implemented in a context where each elevator cooperates with two multi-level storage units.

According to one particular characteristic, there is an identical spacing between two successive levels of the at least one multi-level transfer device and two levels of two vertically superimposed interface conveyors.

This minimizes the movements of the sequencer.

According to one particular characteristic, the levels of the at least one multi-level transfer device are aligned vertically with the levels of the two vertically superimposed interface conveyors.

This further minimizes the movements of the sequencer.

According to one particular characteristic, the automated storage/retrieval system comprises at least one complementary buffer conveyor not included in the at least one multi-level storage unit and the control system is adapted to controlling a transfer of loads between said at least one complementary buffer conveyor and said at least one elevator during an iteration of a rising/descending cycle of said at least one elevator.

Thus, the elevator or elevators can effect entry or exit of loads into/out of the complementary buffer conveyors, these conveyors forming an intermediate shelving used as a buffer to regulate the stream of loads as needed.

In a first implementation, the automated storage/retrieval system comprises at least one exit interface conveyor, an exit elevator, an exit multi-level transfer device and an exit sequencer, and the control system is adapted to controlling:
  a transfer of loads from the at least one multi-level storage unit to the exit elevator, making it possible to pick a group of N loads at each iteration of a rising/descending cycle of the exit elevator with N≤Nmax and Nmax being a capacity of the exit elevator in number of loads;
  a transfer, simultaneously on several levels, from the exit elevator to the multi-level exit device of each group of N loads; and
  a transfer, via the exit sequencer, from the exit multi-level transfer device to the at least one exit interface conveyor, of each group of N loads under a constraint of order of departure of the N loads on said at least one exit interface conveyor.

This first implementation enables the exits of loads out of the automated storage/retrieval system (working in "load retrieval" mode).

Various particular characteristics of this first implementation are proposed.

According to one particular characteristic, the exit elevator is a multi-load elevator at each level and the control system is adapted to the controlling, for each group of N loads, of a sequencing of loads placed at each level of the exit elevator, said sequencing being consistent with said constraint of order of departure of the N loads.

Thus, the sequencing of the loads at each level of the exit elevator (sequencing that is kept at each level of the exit multi-level transfer device) simplifies the sequencing function performed by the exit sequencer (between the exit multi-level transfer device and the at least one exit interface conveyor).

According to one particular characteristic, the automated storage/retrieval system comprises at least two exit interface conveyors, each associated with a distinct stream of loads, and the control system is adapted to controlling, via the exit sequencer, a transfer to each exit interface conveyor of loads belonging to its associated stream of loads.

Thus, the proposed technique is compatible with an exit multi-stream operation (i.e. several streams of loads at exit).

According to one variant, the exit multi-level transfer device is provided with means of vertical moving and replaces the exit sequencer, and the control system is adapted to controlling a transfer of each group of N loads directly from the exit multi-level transfer device to the at least one exit interface conveyor.

Thus, in this variant, the exit multi-level transfer device acts as an exit sequencer.

In a second implementation (in the case of entries, i.e. the storage of loads), the automated storage/retrieval system comprises at least one entry interface conveyor, one entry elevator, one entry multi-level transfer device and one entry sequencer and the control system is adapted to controlling:
  a transfer of loads, via the entry sequencer, from said at least one entry interface conveyor to the entry multi-level transfer device in forming, in the entry multi-level transfer device, groups of N loads distributed on several levels with N≤Nmax and Nmax being a capacity of the entry elevator in number of loads;
  a transfer, simultaneously on several levels, from the entry multi-level transfer device to the entry elevator, of each group of N loads;
  a transfer of each group of N loads from the entry elevator to the at least one multi-level storage unit, under a constraint of depositing of the N loads at each iteration of a rising/descending cycle of the entry elevator.

This second implementation enables entries of loads into the automated storage/retrieval system (operation in "load storage" mode).

Various particular characteristics of this second implementation are proposed.

According to one particular characteristic, the entry elevator is a multi-load elevator at each level and the control system is adapted to the controlling, for each group of N loads, of a sequencing by the entry sequencer of the loads placed at each level of the entry multi-level transfer device, said sequencing being consistent with said constraint of depositing of the N loads.

Thus, the sequencing (carried out by the entry sequencer) of the loads at each level of the entry multi-level transfer device (sequencing which is kept at each level of the entry elevator) makes it simpler to comply with the constraint of depositing of the N loads (on the at least one multi-level storage unit) at each iteration of a rising/descending cycle of the entry elevator.

According to one particular characteristic, the automated storage/retrieval system comprises at least two entry interface conveyors each associated with a distinct stream of loads and the control system is adapted for the controlling, via the entry sequencer, of a transfer from each entry interface conveyor of the loads belonging to its associated stream of loads.

Thus, the proposed technique is compatible with a multi-stream entry operation (i.e. several streams of loads at entry).

According to one variant, the entry multi-level transfer device is provided with vertical moving means and replaces the entry sequencer and the control system is adapted to controlling a transfer of each group of N loads directly from the at least one entry interface conveyor to the entry multi-level transfer device.

Thus, in this variant, the entry multi-level transfer device acts as an entry sequencer.

Another embodiment of the disclosure proposes a method of retrieval in an automated storage/retrieval system as mentioned here above, comprising the following steps:

- transfer of loads from the at least one multi-level storage unit to the exit elevator making it possible to pick a group of N loads at each iteration of a rising/descending cycle of the exit elevator with N≤Nmax and Nmax being a capacity of the exit elevator in number of loads;
- transfer, simultaneously on several levels, from the exit elevator to the exit multi-level transfer device, of each group of N loads;
- transfer, via the exit sequencer, from the exit multi-level transfer device to the at least one exit interface conveyor, of each group of N loads, under said constraint of order of departure of the N loads on the at least one exit interface conveyor.

Another embodiment of the disclosure proposes a method of storage in an automated storage/retrieval system as mentioned here above, comprising the following steps:

- transfer of loads, via the entry sequencer, from said at least one entry interface conveyor to the entry multi-level transfer device, in forming, in the entry multi-level transfer device, of the groups of N loads distributed on several levels with N≤Nmax and Nmax being a capacity of the entry elevator in number of loads;
- a transfer, simultaneously on several levels, from the entry multi-level transfer device to the entry elevator, of each group of N loads;
- transfer of each group of N loads from the entry elevator to the at least one multi-level storage unit, under said constraint of depositing of the N loads at each iteration of a rising/descending cycle of the entry elevator.

Another embodiment of the disclosure proposes a computer program product comprising program code instructions for the implementing of the method of retrieval and/or the method of storage mentioned here above (in any one of their different embodiments) when said program is executed on a computer.

Another embodiment of the disclosure proposes a non-transient computer-readable storage medium storing a computer program comprising a set of instructions executable by a computer to implement the method of retrieval and/or the method of storage mentioned here above (in any one of their different embodiments).

4. LIST OF FIGURES

Figure 2A:
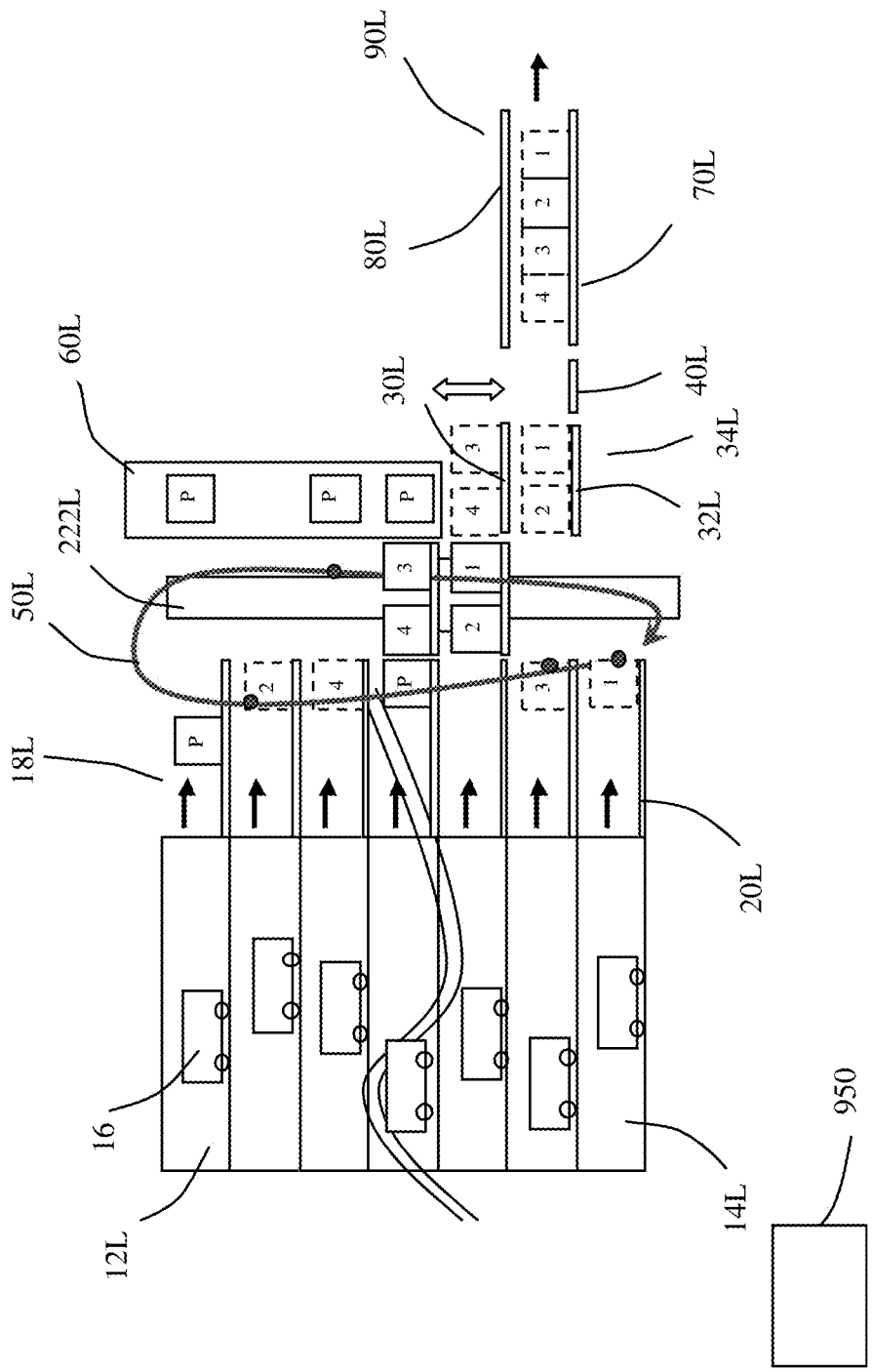
Figure 2B:
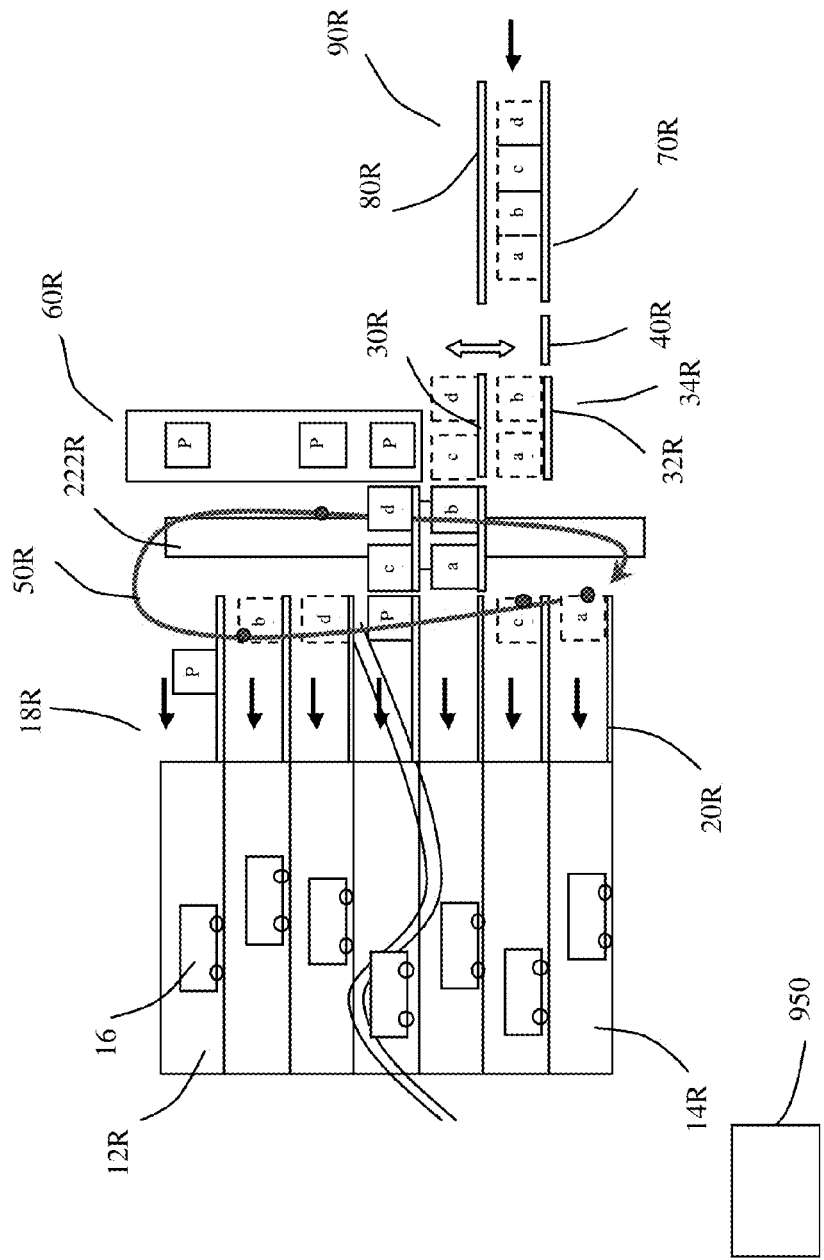
Figure 2C:
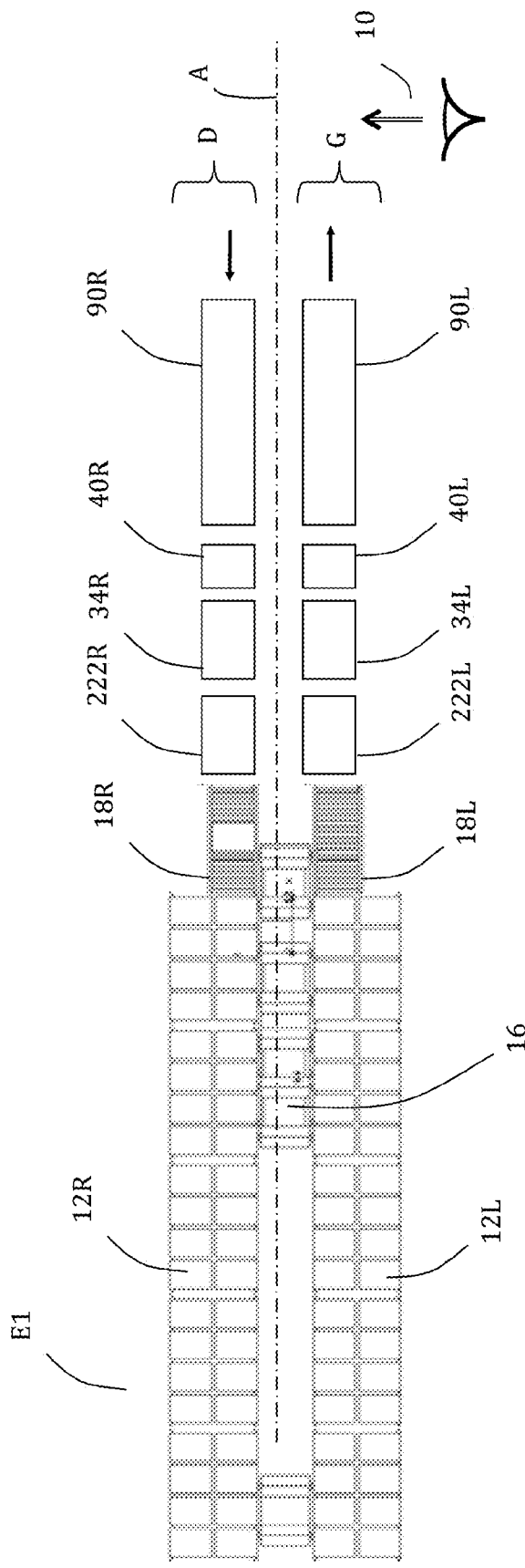
Figure 3:
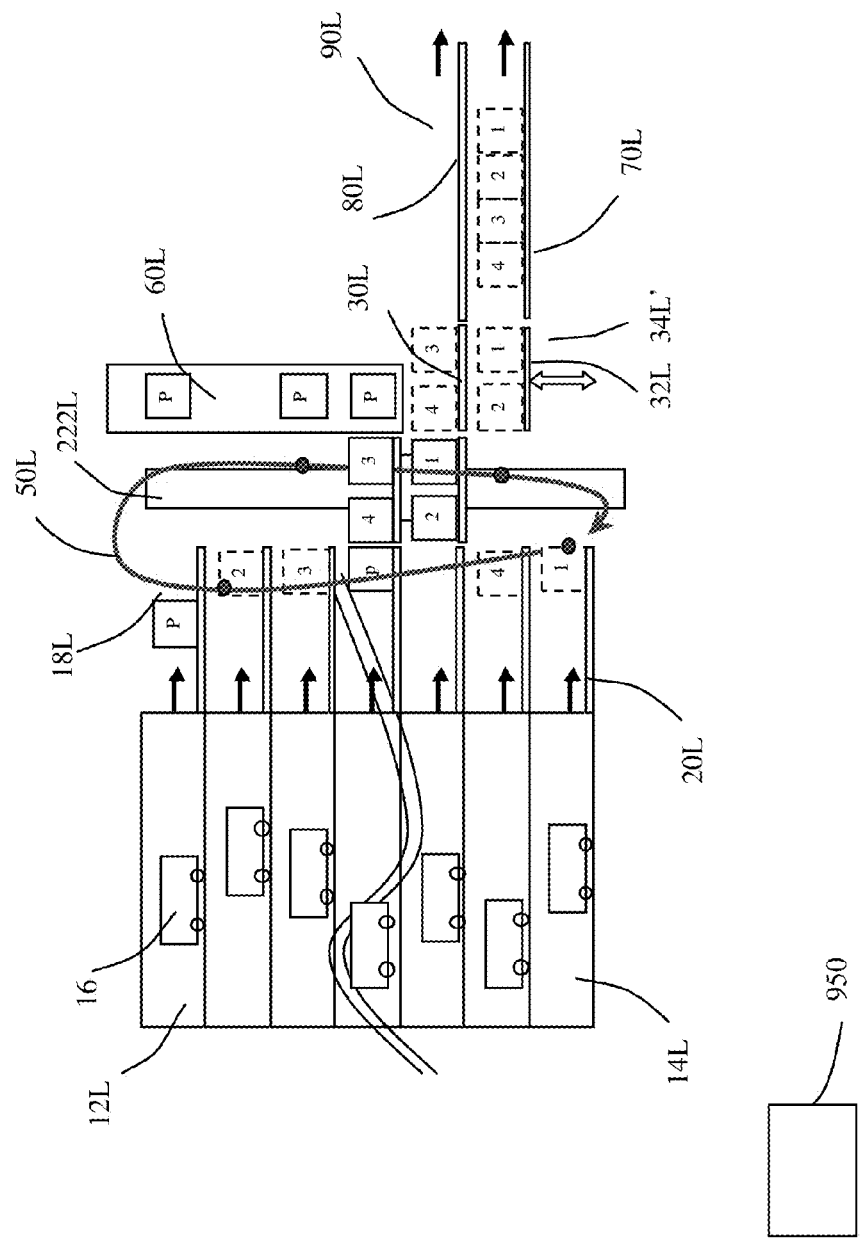
Figure 4:
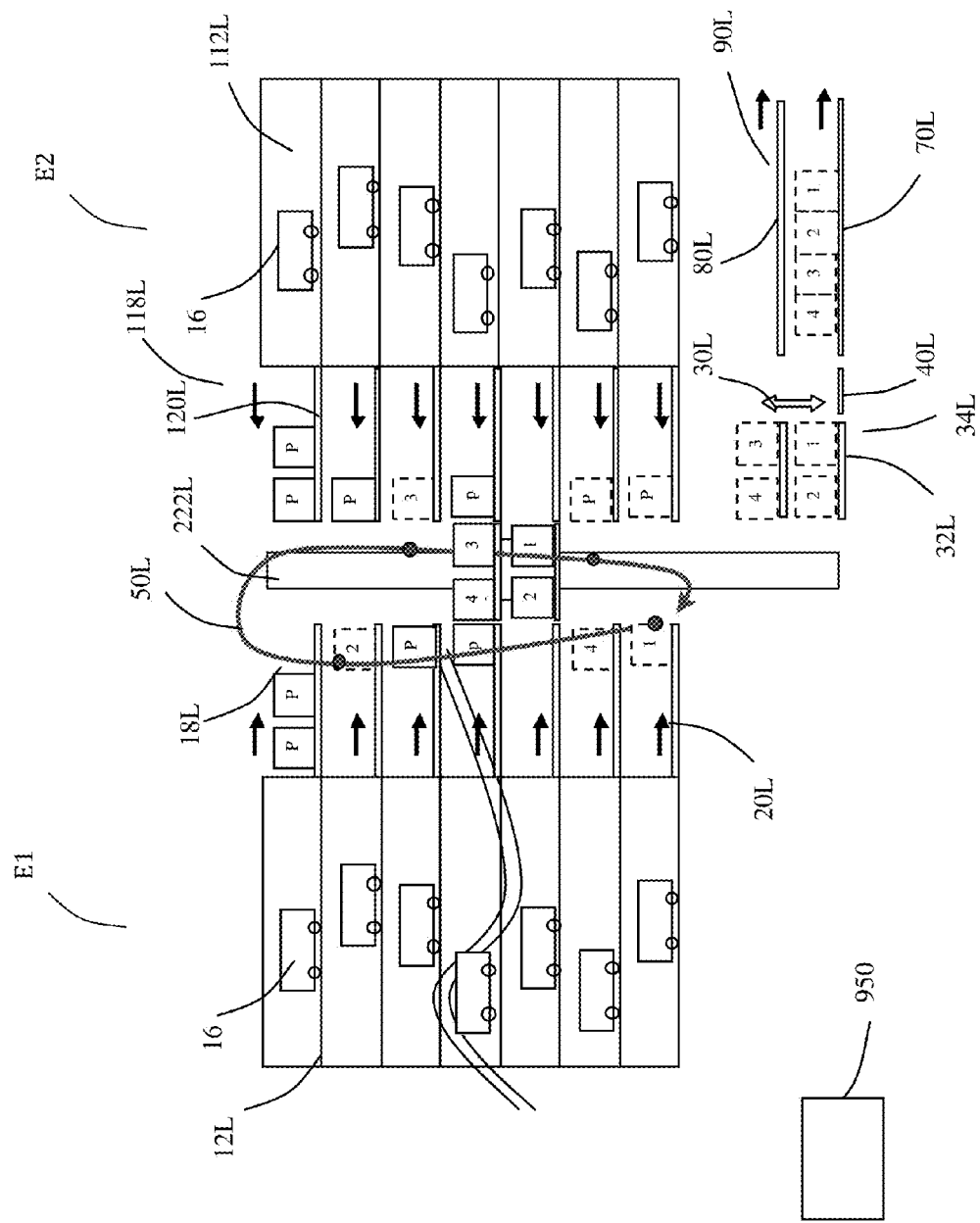
Figure 5:
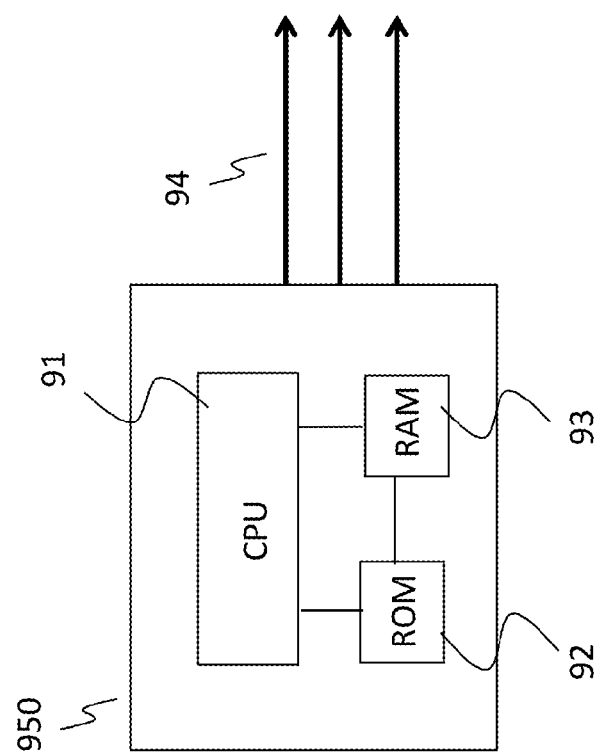
Figure 7:
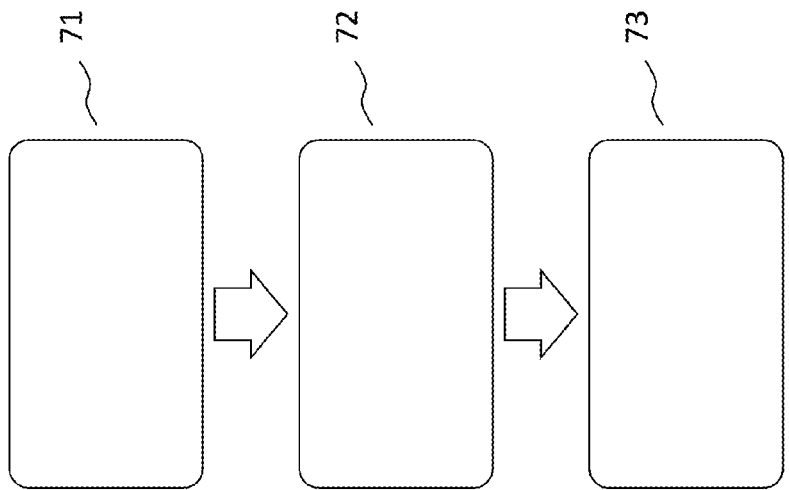
Figure 6:
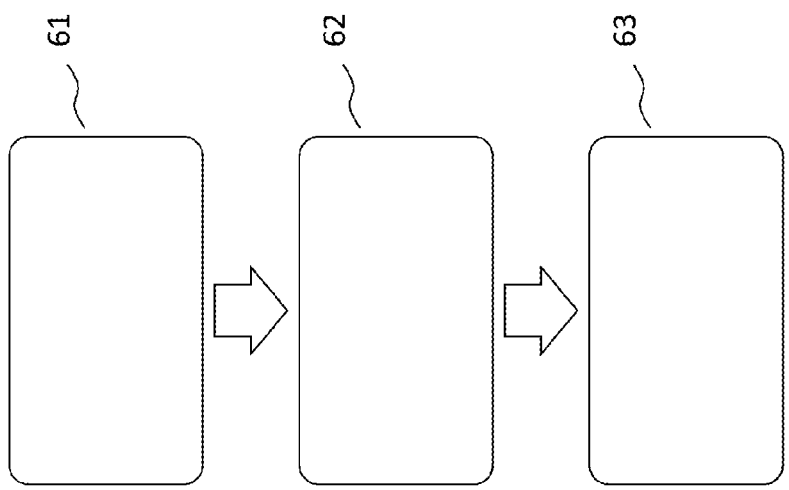

Other features and advantages shall appear from the following description, given by way of an indicative and non-exhaustive example and from the appended drawings, of which:

FIGS. 1A, 1B and 1C (side view of the left-hand part, side view of the right-hand part and top view respectively) already described with reference to the prior art, illustrate an example of an automated storage/retrieval system according to the prior art;

FIGS. 2A, 2B and 2C (side view of the left-hand part, side view of the right-hand part and top view respectively) illustrate an automated storage/retrieval system according to a first embodiment of the disclosure;

FIG. 3 (side view of the left-hand part) illustrates an automated storage/retrieval system according to a second embodiment of the disclosure;

FIG. 4 (side view of the left-hand part) illustrates an automated storage/retrieval system according to a third embodiment of the disclosure; and FIG. 5 presents the simplified structure of a control system according to one particular embodiment of the disclosure;

FIG. 6 is a flowchart of a method of retrieval according to one particular embodiment of the disclosure; and FIG. 7 is a flowchart of a method of storage according to one particular embodiment of the disclosure.

5. DETAILED DESCRIPTION

In all the figures of the present document, the identical elements are designated by a same numerical reference.

Referring now to FIGS. 2A, 2B and 2C (side view of the left-hand part, side view of the right-hand part and top view respectively) we present an automated storage/retrieval system according to a first embodiment of the disclosure.

The system is distinguished from that of the prior art, described further above with reference to FIGS. 1A, 1B and 1C, in that:

- for the left-hand part, it comprises an exit multi-level elevator 222L, an exit multi-level transfer device 34L, and an exit sequencer 40L;
- for the right-hand part, it comprises an entry multi-level elevator 222R, an entry multi-level transfer device 34R, and an entry sequencer 40R.

Besides, the control system 950 is modified relatively to that of the prior art and enables the controlling of these distinctive elements (222L, 222R, 34L, 34R, 40L, 40R).

We now present a detailed view of the left-hand part referring to FIGS. 2A and 2C.

In this example, the exit multi-level elevator 222L is a "four-load elevator": two levels superimposed with a capacity of two loads at each level. Each level comprises a motor-driven conveyor and enables the transportation of two loads delivered by one or more of the exit buffer conveyors 20L (of the exit buffer station 18L).

The exit multi-level elevator 222L also interfaces with the exit multi-level transfer device 34L. This device is capable of simultaneously receiving, at several levels, a set of loads coming from the exit multi-level elevator 222L. It is also provided with two superimposed levels and comprises, at each level, a motor-driven conveyor 30L or 32L. It enables the four loads, simultaneously transportable by the exit multi-level elevator 222L, to be kept pending and does so after they are discharged from the exit multi-level elevator 222L.

To carry out the transfer of the loads, the two levels of the exit multi-level elevator conveyors 222L are aligned with the two levels of the conveyors 30L and 32L of the exit multi-level transfer device 34L, and the set of loads is transferred from the exit multi-level elevator 222L to the exit multi-level transfer device 34L when the exit multi-level elevator 222L is immobilized.

The exit sequencer 40L is capable of transferring loads between the exit multi-level transfer device 34L (and therefore the conveyors 30L and 32L) and the exit interface conveyors 70L and 80L. The exit sequencer 40L is a lifting table with platform type device or any other equivalent device that enables the vertical moving of a load. In this example, the exit sequencer 40L comprises a single level (i.e. a single platform) which is equipped with a portion of motor-driven conveyor enabling the horizontal moving of the load.

The two exit interface conveyors 70L and 80L are superimposed and enable the unloading of the loads towards two destinations (not shown) (for example on the one hand an order-preparing station and on the other hand another lane of multi-level racks).

In one particular embodiment, there is an identical spacing between two successive levels 30L and 32L of the exit multi-level transfer device 34L and between the levels of the two exit interface conveyors 70L and 80L. The levels of the exit multi-level transfer device 34L are aligned vertically with the levels of the two exit interface conveyors 70L and 80L. The levels of the exit multi-level transfer device 34L are vertically aligned with the levels of the two exit interface conveyors 70L and 80L. Thus, the conveyors 30L and 80L are positioned one before the other and this is the same for the conveyors 32L and 70L.

In one variant, the spacing between the two exit interface conveyors 70L and 80L is different from the spacing between the two successive levels 32L and 30L of the exit multi-level transfer device 34L.

For the exit of the loads (the retrieval method), the working of the system is as follows: the control system 950 controls a collecting cycle 50L for collecting N loads (with N≤4 in the example presented) available at the different levels (i.e. at the different exit buffer conveyors 30L) of the exit buffer station 18L so that the exit multi-level elevator 222L collects all the N loads in a single rotation (i.e. a single rising/descending cycle of the exit multi-level elevator 222L). It does this so that the placing of each load on the elevator 22L (in terms of level and location per level) makes it possible, once the set of N loads is transferred to the exit multi-level transfer device 34L (i.e. in the conveyors 30L and 32L), to obtain the optimum resumption for the reconstitution, by means of the exit sequencer 40L, of the sequence (the order) desired on the exit interface conveyors 70L and 80L.

In other words, and as shown in FIG. 6, the control system 950 is adapted to controlling:

step 61: a transfer of loads from the exit buffer conveyors 20L to the exit elevator 222L, making it possible to pick a group of N loads at each iteration of the rising/descending cycle of the exit elevator (with N≤4 in the example presented). For each group of N loads, the sequencing of the loads placed at each level of the exit elevator is consistent with the constraint defined here below (constraint of order of departure of the N loads);

step 62: a transfer, simultaneously on two levels, from the exit elevator 222L to the exit multi-level transfer device 34L, of each group of N loads; and step 63: a transfer, via the exit sequencer 40L, from the exit multi-level transfer device 34L to at least one of the exit interface conveyors 70L and 80L, of each group of N loads, under a constraint of order of departure of the N loads on this exit interface conveyor or conveyors 70L and 80L.

If the system manages several streams of loads at exit, the control system is adapted for the controlling, via the exit sequencer 40L, of a transfer to each of the two exit interface conveyors 70L and 80L of the loads of the stream associated with it.

Thus, in the example proposed in FIG. 2A, to collect the loads 1, 2, 3 and 4 on the different exit buffer conveyors 20L of the different levels of the exit buffer station 18L and to make them available on the exit interface conveyor 70L in the desired sequence corresponding to the order "1, 2, 3 and 4", the control system 950 will:

control a collecting cycle 50L in a clockwise sense in order to collect the load 1 and place it on the first level of the elevator 222L in the right-hand position and then the collect the load 3 and place it in the second level of the elevator in the right-hand position, then collect the load 2 and place it at the first level of the elevator in the left-hand position, and finally collect the load 4 and place it on the second level of the elevator in the left-hand position;

control the transfer of the set of loads of the elevator 222L towards the transfer device 34L (comprising the conveyors 30L and 32L);

control the transfer, via the sequencer 40L, of the first two containers in the sequence, namely the containers 1 and 2, from the conveyor 32L, towards the exit interface conveyor 70L and then the transfer, via the sequencer 40L, of the two last containers in the sequence, namely the containers 3 and 4, from the conveyor 32L towards the exit interface conveyor 70L.

Referring to FIGS. 2B and 2C, we now present a detailed view of the right-hand part.

In this example, the entry multi-level elevator 222R is a "four-load elevator": two levels superimposed with a capacity of two loads at each level. Each level comprises a motor-driven conveyor and enables the transportation of two loads delivered by one or more of the entry buffer conveyors 20R (of the entry buffer station 18R).

The entry multi-level elevator 222R also interfaces with the exit multi-level transfer device 34R. The entry multi-level elevator 222R is capable of simultaneously receiving, at several levels, a set of loads coming from the entry multi-level elevator 34R. This device is also provided with two superimposed levels and comprises, at each level, a motor-driven conveyor 30R or 32R. It enables the four loads, simultaneously transportable by the entry multi-level elevator 222R, to be kept pending and does so before they are unloaded from the entry multi-level elevator 222R.

To carry out the transfer of the loads, the two levels of the entry multi-level elevator conveyor 222R are aligned with the two levels of the conveyors 30R and 32R of the entry multi-level transfer device 34R, and the set of loads is transferred from the entry multi-level transfer device 34R to the entry multi-level transfer device 222R when the entry multi-level elevator 222R is immobilized.

The entry sequencer 40R is capable of transferring loads from the entry interface conveyors 70R and 80R towards the entry multi-level transfer device 34R (and therefore the conveyors 30R and 32R). The exit sequencer 40L is a lifting table with platform type device or any other equivalent device that enables the vertical moving of a load. In this example, the entry sequencer 40R comprises a single level (i.e. a single platform) which is equipped with a portion of motor-driven conveyor enabling the horizontal moving of the load.

The two entry interface conveyors 70R and 80R are superimposed and enable the arrival of the loads coming from two sources (not shown) (for example on the one hand a re-procurement station and on the other hand another lane of multi-level racks).

In one particular embodiment, there is an identical spacing between two successive levels 30R and 32R of the entry multi-level transfer device 34R and between the levels of the two entry interface conveyors 70R and 80R. The levels of the entry multi-level transfer device 34R are aligned vertically with the levels of the two entry interface conveyors 70R and 80R. Thus, the conveyors 30R and 80R are positioned to be facing each other and this is the same for the conveyors 32R and 70R.

In one variant, the spacing between the two entry interface conveyors 70R and 80R is different from the spacing between the two successive levels 32R and 30R of the entry multi-level transfer device 34R.

For the entry of the loads (the storage method), the working of the system is as follows: the control system 950 controls a transfer cycle for the transferring, via the entry sequencer 40R, of N loads (with N≤4 in the example presented) from the entry interface conveyors 70R and 80R to the entry multi-level transfer device 34R (i.e. the conveyors 30R and 32R). The control system does this in such a way that the placing of the N loads, makes it possible, once these N loads are transferred from the entry multi-level transfer device 34R to the entry multi-level elevator 222R, for this entry multi-level elevator 222R to deposit each of the N loads in one of the entry buffer conveyors 20R of the entry buffer station 18R, in a single rotation (i.e. a single rising/descending cycle of the entry multi-level elevator 222R).

In other words, and as illustrated in FIG. 7, the control system 950 is adapted to controlling:
 step 71: a transfer of loads, via the entry sequencer 40R, from at least one of the entry interface conveyors 70R and 80R towards the entry multi-level transfer device 34R and in forming in the entry multi-level transfer device groups of N loads distributed over several levels (with N≤4 in the example presented). For each group of N loads, the sequencing (by the entry sequencer 40R) of the loads placed at each level of the entry multi-level transfer device 34R is consistent with the constraint defined here below (constraint of depositing of the N loads on the entry buffer conveyors 20R);
 step 72: a transfer, simultaneously on several levels, from the entry multi-level transfer device 34R to the entry elevator 222R, of each group of N loads;
 step 73: a transfer of each group of N loads from the<entry elevator 222R to the entry buffer conveyors 20R of the entry buffer station 18R under the constraint of depositing of N loads at each iteration of a rising/descending cycle of the entry elevator.

If the system manages several streams of loads at entry (each associated with and received on one of the entry interface conveyors 70R and 80R), the control system is adapted to controlling a transfer, via the entry sequencer 40R, from each of the two entry interface conveyors 70R and 80R, of loads belonging to its associated stream of loads.

Thus, in the example proposed in FIG. 2B, to take the loads a, b, c and d on the entry interface conveyor 70R and deposit them on the different entry buffer conveyors 20R of the different levels of the entry buffer station 18R, the control system 950 will:
 control a transfer cycle, via the entry sequencer 40R, in order to take the load a and place it on the first level (conveyor 32R) of the entry multi-level transfer device 34R in the left-hand position and take the load b and place it on the first level (conveyor 32R) of the entry multi-level transfer device 34R in the right-hand position, take the load c and place it on the second level (conveyor 30R) of the entry multi-level transfer device 34R in the left-hand position and finally take the load d and place it on the second level (conveyor 30R) of the entry multi-level transfer device 34R in the right-hand position;
 control the transfer of the set of loads from the entry multi-level transfer device 34R (comprising the conveyors 30R and 32R) towards the elevator 222R;
 control a depositing cycle 50R in a clockwise sense in order to deposit the loads on the entry buffer conveyors 20R into the national entry buffer station 18R.

In one particular embodiment illustrated in FIG. 2A, an intermediate shelving 60L can be disposed so as to be facing the exit buffer station 18L on all or part of the height of the rack 18L (above the exit multi-level transfer device 34L in the example of FIG. 2A) and this is done so that the exit elevator 222L positioned between the exit buffer station 18L and this intermediate shelving 60L is also capable of making entry and exit motions movements of loads in this intermediate shelving. This intermediate shelving comprises one or more complementary buffer conveyors. It can be used as a buffer to regulate the stream of loads at exit as need be.

Similarly, as illustrated in FIG. 2B, an intermediate shelving 60R can be disposed so as to be facing the entry buffer station 18R on all or part of the height of the rack 18R (above the entry multi-level transfer device 34R in the example of FIG. 2B) and this is done so that the entry elevator 222R positioned between the entry buffer station 18R and this set of intermediate racks 60R is also capable of making movements of entry and exit of loads in this intermediate shelving.

FIG. 3 (side view of the left-hand side) illustrates an automated storage/retrieval system according to a second embodiment of the disclosure in which the exit multi-level transfer device (referenced 34L' and comprising the conveyors 30L and 32L) acts as an exit sequencer, i.e. replaces the exit sequencer referenced 40L in FIG. 2A.

To carry out this additional function, the exit multi-level transfer device 34L' is equipped with means of the alternating elevator type with a platform or any other equivalent means enabling the vertical movement of the loads between two or more levels.

In order to unload the loads according to the sequence "1, 2, 3 and 4", the conveyor 32L gets aligned horizontally with the exit interface conveyor 70L. Once the containers 1 and 2 are unloaded, the exit multi-level transfer device 34L' makes a vertical shift so that the conveyor 30L gets horizontally aligned with the exit interface conveyor 70L. The containers 3 and 4 are then unloaded following the containers 1 and 2 on the exit interface conveyor 70L thus complying with the sequence.

Similarly, the entry multi-level transfer device 34R (comprising the conveyors 30R and 32R) can be modified to act as an entry sequencer, i.e. replace the entry sequencer referenced 40R in FIG. 2B.

FIG. 4 (side view of the left-hand part) illustrates an automated storage/retrieval system according to a third embodiment of the disclosure.

The system comprises a second set of shelving E2 (of the same type as the first E1) comprising two multi-level racks (only the one referenced 112L is visible in FIG. 4), exit and entry buffer stations (only the exit buffer station 118L can be seen in FIG. 4).

The exit buffer station 118L is positioned at one end of the rack 112L and is adjacent to it. It is constituted by a set of exit buffer conveyors 120L. the number of exit buffer conveyors 120L is the same as that of levels in the stages 112L.

The exit multi-level elevator 222L is positioned between the exit buffer stations 18L and 118L for a transfer of loads between these buffer stations and the exit interface conveyors 70L and 80L via the exit multi-level transfer device 34L and the exit sequencer 40L.

In this third embodiment, during the same collection cycle 50L, the exit multi-level elevator 222L can collect loads on the two exit buffer stations 18L and 118L in order to pre-constitute the requested sequence. Thus, in the example proposed in FIG. 4, the exit multi-level elevator 222L collects the loads 1, 2 and 4 on the exit buffer conveyors 20L of the exit buffer station 18L and the load 3 on one of the exit buffer conveyors 120L of the exit buffer station 118L. It collects them in the following order: 1, 2, 3 and 4.

In the same way (not shown), the entry multi-level elevator 222R can deposit the loads on the two entry buffer stations of the two storage units.

In another particular embodiment, the conveyors included in the apparatuses of the left-hand part of the system (i.e. see FIG. 2A, the exit buffer conveyors 20L, the conveyors of the different levels of the exit multi-level elevator 222L, the conveyors of the different levels of the exit multi-level transfer device 34L (comprising the conveyors 30L and 32L), and the conveyor of the single exit sequencer level 40L) can be used:
either in one sense which enables an operation of the left-hand part of the exit system at the exit of the loads, as described further above with reference to FIG. 2A;
or in the other sense, enabling an operation of the left-hand part of the system at entry of the loads (working identical to that described further above for the right-hand part of the system with reference to FIG. 2B). This mode makes it possible to overcome a dysfunction of the right-hand part of the system (see for example the entry elevator).

Similarly, the conveyors included in the apparatuses of the right-hand part of the system (i.e. see FIG. 2B, the entry buffer conveyors 20R, the conveyors of the different levels of the entry multi-level elevator 222R, the conveyors of the different levels of the entry multi-level transfer device 34R (comprising the conveyors 30R and 32R) and the conveyor of the single level of the entry sequencer 40R) can be used:
either in one sense, enabling an operation of the right-hand part of the system at the entry of the loads, as described further above with reference to FIG. 2B;
or in the other sense, enabling an operation of the right-hand part of the system at exit of the loads (operation identical to the one described further above for the left-hand part of the system, with reference to FIG. 2A). This mode makes it possible to overcome a dysfunction of the left-hand part of the system (see for example the exit elevator).

FIG. 5 presents a simplified structure of a control system 950 according to one particular embodiment of the disclosure, implementing the method of retrieval and/or the method of storage described further above with reference to FIGS. 2A, 2B, 2C, 3, 4, 6 and 7.

The control system 950 can comprise a random-access memory 93 (for example a RAM), a processing unit 91, equipped for example with a processor, and driven by a computer program stored in a read-only memory 32 (for example a ROM or a hard disk drive). At initialization, the code instructions of the computer program are for example loaded into the random-access memory 93 and then executed by the processor of the processing unit 91. Then, according to the instructions of the program, the processing unit 91 outputs commands 94 for the control of the different apparatuses of the system (especially, for the left-hand part for example, the exit buffer conveyors 20L, the exit multi-level elevator 222L, the exit multi-level transfer device 34L (comprising the conveyors 30L and 32L) and the exit sequencer 40L).

This FIG. 6 illustrates only one particular way, among several other possible ways, of carrying out the above-mentioned methods (see FIGS. 6 and 7). Indeed, the technique of the disclosure can be achieved equally well:
on a re-programmable computing machine (a PC, a DSP processor, or a microcontroller) executing a program comprising a sequence of instructions, or
on a dedicated computation machine (for example a set of logic gates such as an FPGA or an ASIC or any other hardware module).

If an embodiment of the disclosure is implanted in a reprogrammable computing machine, then the corresponding program (i.e. the sequence of instructions) could be stored in a storage medium that is detachable (such as for example a floppy disk, a CD ROM or a DVD ROM) or non-detachable, this storage medium being partially or totally readable by a computer or a processor.

At least one embodiment of the present disclosure provides a technique making it possible to significantly increase the general pace of an automated storage/retrieval system (as compared with prior-art systems, especially those of the type described further above with reference to FIGS. 1A, 1B and 1C) while at the same time complying with sequencing constraints.

At least one embodiment of the present disclosure provides a technique of this kind that is simple to implement and costs little.

At least one embodiment of the present disclosure provides a technique of this kind that is compatible with a multi-stream operation (one or more streams of loads at entry and/or one or more streams of loads at exit).

Although the present disclosure has been described with reference to one or more examples, workers skilled in the art will recognize that changes may be made in form and detail without departing from the scope of the disclosure and/or the appended claims.

The invention claimed is:
1. An automated storage/retrieval system comprising:
a control system,
at least one storage unit comprising several levels at which loads can be picked or deposited,
at least one exit interface conveyor for exits of loads out of the system,
an exit elevator comprising K vertically-movable levels, with K≥2, which are superimposed and configured to enable a receiving of a plurality of loads from said at least one storage unit, and a simultaneous vertical transportation of said plurality of loads,
an exit transfer device, interfacing with said exit elevator and comprising K levels, which are superimposed and configured to receive simultaneously said plurality of loads from said K levels of said exit elevator when the K levels of the exit elevator are aligned with the K levels of the exit transfer device, said exit transfer device fulfilling a buffer function enabling said plurality of loads to be put on hold after they have been unloaded by the exit elevator, and
an exit sequencer provided with means of vertical moving and configured to fulfill a sequencing function enabling a transfer, in a determined order, of said plurality of loads from said K levels of said exit transfer device to said at least one exit interface conveyor, wherein the control system is configured to control:
- at each iteration of a rising/descending cycle of the exit elevator, a transfer of a group of N loads from the at least one storage unit to the K levels of the exit elevator, with N being smaller than or equal to a capacity of the exit elevator in number of loads;
- for each group of N loads,
  - a transfer, simultaneously from the K levels of the exit elevator to the K levels of the exit transfer device, of said group of N loads; and
  - a transfer of said group of N loads, via the exit sequencer, from the K levels of the exit transfer device to the at least one exit interface conveyor, under a constraint of order of departure of the N loads on said at least one exit interface conveyor.

2. The system according to claim 1, wherein the exit transfer device is provided with means of vertical moving and replaces the exit sequencer, and the control system is adapted to controlling a transfer of each group of N loads directly from the exit transfer device to the at least one exit interface conveyor.

3. The system according to claim 1, wherein there is an identical spacing between two successive levels of the exit transfer device and two levels of two vertically superimposed exit interface conveyors.

4. The system according to claim 3, wherein the levels of the exit transfer device are aligned vertically with the levels of the two vertically superimposed exit interface conveyors.

5. The system according to claim 1, wherein the exit elevator is a multi-load elevator at each level and the control system is adapted to the controlling, for each group of N loads, of a sequencing of loads placed at each level of the exit elevator, said sequencing being consistent with said constraint of order of departure of the N loads.

6. The system according to claim 1, comprising at least two exit interface conveyors, each associated with a distinct stream of loads, and wherein the control system is adapted to controlling, via the exit sequencer, a transfer to each exit interface conveyor of loads belonging to its associated stream of loads.

7. An automated storage/retrieval system comprising:
- a control system,
- at least one storage unit comprising several levels on which the loads can be picked or deposited,
- at least one entry interface conveyor for entries of loads into the system,
- an entry transfer device comprising K levels, with K≥2, which are superimposed and configured to enable a receiving of loads,
- an entry sequencer provided with means of vertical moving, and configured to fulfill a transfer of a plurality of loads from said at least one entry interface conveyor to said K levels of said entry transfer device, and
- an entry elevator, interfacing with said entry transfer device and comprising K vertically-movable levels which are superimposed and configured to enable a receiving of said plurality of loads from said K levels of said entry transfer device when the K levels of the entry elevator are aligned with the K levels of the entry transfer device, and a vertical transportation of said plurality of loads,
- said entry transfer device fulfilling a buffer function enabling said plurality of loads to be put on hold before they are loaded onto the entry elevator,
wherein the control system is configured to control:
- a transfer of loads via the entry sequencer, from said at least one entry interface conveyor to the K levels of the entry transfer device in forming, in the entry transfer device, groups of N loads distributed on the K levels with N being smaller than or equal to a capacity of the entry elevator in number of loads;
- for each group of N loads,
  - a transfer, simultaneously from the K levels of the entry transfer device to the K levels of the entry elevator, of said group of N loads; and
  - at an iteration of a rising/descending cycle of the entry elevator, a transfer of said group of N loads, from the K levels of the entry elevator to the at least one multi-level storage unit under a constraint of depositing of the N loads.

8. The system according to claim 7, wherein the entry transfer device is provided with means of vertical moving and replaces the exit sequencer, and wherein the control system is adapted to controlling a transfer of each group of N loads directly from the at least one entry interface conveyor to the entry transfer device.

9. The system according to claim 7, wherein there is an identical spacing between two successive levels of the entry transfer device and two levels of two vertically superimposed entry interface conveyors.

10. The system according to claim 9, wherein the levels of the entry transfer device are aligned vertically with the levels of the two vertically superimposed entry interface conveyors.

11. The system according to claim 7, wherein the entry elevator is a multi-load elevator at each level and the control system is adapted to the controlling, for each group of N loads, of a sequencing by the entry sequencer of the loads placed at each level of the entry transfer device, said sequencing being consistent with said constraint of depositing of the N loads.

12. The system according to claim 7, comprising at least two entry interface conveyors each associated with a distinct stream of loads and the control system is adapted to the controlling, via the entry sequencer, of a transfer from each entry interface conveyor of the loads belonging to its associated stream of loads.

13. A method of retrieval in an automated storage/retrieval system comprising:
- a control system,
- at least one storage unit comprising several levels at which loads can be picked or deposited,
- at least one exit interface conveyor for exits of loads out of the system,
- an exit elevator configured to receive, over K vertically-movable levels of said exit elevator, with K≥2, a plurality of loads from said at least one storage unit, and to carry out a vertical and simultaneous transport of said plurality of loads,
- an exit transfer device, interfacing with said exit elevator and configured to receive simultaneously, over K levels of said exit transfer device, said plurality of loads from said K levels of said exit elevator when the K levels of the exit elevator are aligned with the K levels of the exit transfer device, said exit transfer device fulfilling a buffer function enabling said plurality of loads to be put on hold after they have been unloaded by the exit elevator, and
- an exit sequencer provided with means of vertical moving and configured to fulfill a sequencing function enabling a transfer, in a determined order, of said plurality of loads from said K levels of said exit transfer device to said at least one exit interface conveyor, said method comprising the following acts:

at each iteration of a rising/descending cycle of the exit elevator, transferring a group of N loads from the at least one storage unit to the K levels of the exit elevator, with N being smaller than or equal to a capacity of the exit elevator in number of loads;

for each group of N loads:
- transferring, simultaneously from the K levels of the exit elevator to the K levels of the exit transfer device, said group of N loads; and
- transferring of said group of N loads, via the exit sequencer, from the K levels of the exit transfer device to the at least one exit interface conveyor, under a constraint of order of departure the N loads on said at least one exit interface conveyor.

14. A method of storage in an automated storage/retrieval system comprising:
- a control system,
- at least one storage unit comprising several levels on which the loads can be picked or deposited,
- at least one entry interface conveyor for entries of loads into the system,
- an entry transfer device, configured to receive loads over K levels of said entry transfer device, with K≥2,
- an entry sequencer provided with means of vertical moving, and configured to fulfill a transfer of a plurality of loads from said at least one entry interface conveyor to said K levels of said exit transfer device, and
- an entry elevator, interfacing with said entry transfer device and configured to receive simultaneously, over K vertically-movable levels of said entry elevator, a plurality of loads from said K levels of said exit transfer device, and to carry out a vertical and simultaneous transport of said plurality of loads when the K levels of the entry elevator are aligned with the K levels of the entry transfer device,
- said entry transfer device fulfilling a buffer function enabling said plurality of loads to be put on hold before they are loaded onto the entry elevator, said method comprising the following acts:
- transferring loads via the entry sequencer, from said at least one entry interface conveyor to the K levels of the entry transfer device in forming, in the entry transfer device, groups of N loads distributed on the K levels with N being smaller than or equal to a capacity of the entry elevator in number of loads;

for each group of N loads:
- transferring, simultaneously from the K levels of the entry transfer device to the K levels of the entry elevator, of said group of N load; and
- at an iteration of a rising/descending cycle of the entry elevator, transferring said group of N loads, from the K levels of the entry elevator to the at least one multi-level storage unit under a constraint of depositing of the N loads.

* * * * *